UNITED STATES PATENT OFFICE.

HENREY H. HUNT, OF SAN ANTONIO, TEXAS.

COMPOUND FOR MAKING BRICK, TILE, &c.

SPECIFICATION forming part of Letters Patent No. 260,203, dated June 27, 1882.

Application filed April 18, 1882. (No specimens.)

*To all whom it may concern:*

Be it known that I, HENREY HARDON HUNT, of San Antonio, in the county of Bexar and State of Texas, have invented a new and Improved Compound for Making Brick, Tile, &c.; and I do hereby declare that the following is a full, clear, and exact description of the same.

My invention relates to a novel composition for making brick, tile, and analogous material; and it consists in combining hydraulic cement with a soft stone known as "magnesian limestone," which is found in great abundance in Western Texas, and which has heretofore been considered a waste material.

In preparing the compound I take three-fourths of a pound of hydraulic cement and mix with it three and one-half pounds of the soft stone well ground up. These materials are thoroughly mixed while dry. They are then dampened and put in molds and pressed. They are next taken out of press and allowed to dry for one day, after which they are set in water and kept there for forty-eight hours. The brick or tile, as the case may be, are then taken out and are ready for use.

Having thus described my invention, what I claim as new is—

A compound for making brick, tile, &c., composed of hydraulic cement and the pulverized stone described, combined in the manner and about the proportions set forth.

HENREY HARDON HUNT.

Witnesses:
RICHARD EDWARD BOND,
THOMAS SAMUEL HARRISON.